(12) United States Patent
Gupta et al.

(10) Patent No.: US 11,546,552 B1
(45) Date of Patent: Jan. 3, 2023

(54) SYSTEM AND METHOD FOR REAL-LIFE INTERACTIVE EXPERIENCE BETWEEN EVENT PARTICIPANTS IN A VIRTUAL GATHERING

(71) Applicants: Aniruddha Gupta, Johns Creek, GA (US); Arulita Gupta, Johns Creek, GA (US); Preeti Gupta, Johns Creek, GA (US); Kishor Kumar Gupta, Johns Creek, GA (US)

(72) Inventors: Aniruddha Gupta, Johns Creek, GA (US); Arulita Gupta, Johns Creek, GA (US); Preeti Gupta, Johns Creek, GA (US); Kishor Kumar Gupta, Johns Creek, GA (US)

( * ) Notice: Subject to any disclaimer, the term of this patent is extended or adjusted under 35 U.S.C. 154(b) by 0 days.

(21) Appl. No.: 17/468,650

(22) Filed: Sep. 7, 2021

Related U.S. Application Data (60) Provisional application No. 63/078,204, filed on Sep. 14, 2020.

(51) Int. Cl.
| | |
|---|---|
| *H04L 51/48* | (2022.01) |
| *H04L 67/54* | (2022.01) |
| *H04N 7/15* | (2006.01) |
| *G06F 3/0482* | (2013.01) |
| *G06F 3/04817* | (2022.01) |

(52) U.S. Cl.
CPC ........... *H04N 7/157* (2013.01); *G06F 3/0482* (2013.01); *G06F 3/04817* (2013.01); *H04L 51/48* (2022.05); *H04L 67/54* (2022.05); *H04N 7/155* (2013.01)

(58) Field of Classification Search
None
See application file for complete search history.

(56) References Cited

U.S. PATENT DOCUMENTS

| | | | | |
|---|---|---|---|---|
| 2008/0158373 | A1* | 7/2008 | Chu | H04N 5/23206 348/E5.042 |
| 2017/0302709 | A1* | 10/2017 | Jones | H04L 51/046 |
| 2017/0365102 | A1* | 12/2017 | Huston | G06T 17/00 |

* cited by examiner

*Primary Examiner* — Angela Nguyen (57) ABSTRACT

A system and method for real-life interactive experience between virtual participants in a gathering of up to thousands of people attending a streamed event, using their computers and mobile devices. The virtual participants sit at boxes and tables at the event and see video and hear audio of other participants sitting at the same table and box. The participants interact with other participants of their choosing without disturbing the rest of the participants. They can use local chat boxes and global chat boxes to chat with the participants of the event. The participants may virtually move from one area to another area of the event using the event layout and sit in a new area of their choosing as they would at an in-person event while watching the streaming of the event thus providing a close to real-life experience of interacting with the event participants.

24 Claims, 6 Drawing Sheets

SYSTEM AND METHOD FOR REAL-LIFE INTERACTIVE EXPERIENCE BETWEEN EVENT PARTICIPANTS IN A VIRTUAL GATHERING

CROSS-REFERENCE TO RELATED APPLICATION

This application claims priority under 35 USC 119 (e) to U.S. Provisional Patent Application Ser. No. 63/078,204 filed on Sep. 14, 2020 with the Title: "Video gathering—meeting virtually but close to real-life experience" which is incorporated herein by reference, in its entirety.

FIELD OF THE INVENTION

The present invention generally relates to virtual interactive communications between individuals through internet platforms. More particularly, the invention relates to a system and method for a real-life interactive experience between event participants in a virtual gathering.

BACKGROUND OF THE INVENTION

Individuals and businesses use video chat platforms such as Zoom™, Microsoft Teams™, Webex™, and Google Meet™ to communicate with each other one on one, or in small groups, to socialize, celebrate special occasions such as birthdays, weddings, family gatherings, or conduct business. These platforms allow users to see and talk to their family, friends, or colleagues virtually, without leaving their residence, office, or other locations. One of the setbacks of these platforms is that communication becomes difficult in large gatherings when everyone tries to speak at the same time. To avoid the resulting cacophony and mayhem, large events are usually conducted in conference mode in which one person speaks and everyone else listens, making it more or less a one-way communication with the participants not being able to communicate directly with each other. The other drawback with these platforms is that, if a participant does not want to see or hear from one or more of the attendees, the participant has no means to mute the audio and/or stop the video of these other attendees without muting and stopping the video of these other attendees for all attendees at the event. These platforms have features like a whiteboard, breakout rooms, town hall meetings, and conferences. However, they do not have a means for participants to communicate and interact with each other in real time while they are in remote locations watching the same event.

The present invention overcomes the deficiencies in the prior art platforms that provide virtual communications between individuals and groups of individuals. In the system and method of the present invention, participants in events having small to large gatherings experience real life close interactions with other event participants while viewing the event. The exemplary features of the present invention will become obvious to one skilled in the art through the summary of the invention, detailed description of the invention, and the claims that follow.

SUMMARY OF THE INVENTION

The present invention is a virtual gathering online platform that allows for a real-life interactive experience between virtual participants in a gathering of few people to hundreds of thousands of people attending a streamed event, using their computers or mobile devices. Participants in such an event can join and sit in the event virtually using their computer and/or mobile devices. The participants in the event can watch the video/audio streaming of the event and the event layout on their computer and/or mobile device while seeing and chatting with other people attending the event, sitting virtually around them. The participants may virtually move from one area to another area of the event using the event layout and sit in a new area of their choosing as they would at an in-person event while watching the video/audio streaming of the event. After moving to a different virtual location within the event, they can see and talk to the people sitting around them at the new location. As the participants mingle and move in the crowd gathered for the event, they can stop by and meet other participants around them while watching the event. The participants of the event interact with other participants of their choosing without disturbing the rest of the participants. Participants can also see the video/audio of the participants virtually sitting with them. In general, the platform of the invention provides a close to real-life experience for virtual participants of an event compared to other platforms presently available. The platform is a virtual gathering online platform and may be referred to as virtual gathering platform, system platform, website platform, web application platform, online application, mobile application, computer-based program, computer application, and application software.

In the exemplary embodiment of the platform of the present invention, the host of the virtual gathering event creates the streaming event through the host section of the virtual gathering online platform of the invention, and provides the details of the event including but not limited to, event name, event type, event description, the maximum number of participants/seats per box or table, price per box or table, seat price, event location, and uploads or selects event picture, uploads or selects event layout, selects if the event is public or private, selects event date and time, and selects the option of reserving a box or table provided for the event. Customers who want to be participants in the event create an account with the virtual gathering online platform of the system using their computers or mobile devices. After creating and logging into their account, those who want to watch and virtually interact with other participants of the event can buy a seat, reserve a box or table, and pay the price online as customers. On the scheduled date and time, the host streams the event and the participants watch the live or prerecorded video/audio streaming of the event through their computers, or other mobile device's graphical user interface (GUI) while virtually sitting at their remote locations, and virtually interacting with family, friends, or even unknown people. All virtual participants can see the same streaming of the event by going on to the watch event screen on their computer or mobile device. After joining the event, participants will be able to see the streaming of the event and the video/audio of the other participants sitting with them. Participants will also see the event layout. For example, in weddings, participants will see the seating arrangement also referred to as wedding layout, event layout, table layout, box layout, etc.

In the embodiments of the system and method of the present invention, participants are allowed to move between boxes and tables depending on the host's restrictions. Participants who have seats in a reserved box or table can move to different locations in the event layout to meet other people and come back to their reserved seats any time. A participants can see the list of all participants sitting at the same box/table as the participant. A participant can also see a list of all participants in the event. The participants can also see which boxes or tables are occupied and which seats are vacant in a particular box or table and move to that box or table and sit there if a seat is vacant. On the watch event screen, participants can also see the video and hear the audio of all other participants sitting at the same table as them. Participants can also search for other participants, see their seat number and box or table number, and move to their location if an unreserved seat is vacant. A participant can move to any unreserved box or table during the event and come back anytime to their reserved box or table. If a seat is not reserved in a reserved box or table and the current occupant moves to a different location, that seat becomes available for all participants of the event. If a box or table is reserved, then only a participant that has a reserved seat in that reserved box or table is allowed at that box or table. Any participant can sit at an unreserved table or box.

In the embodiments of the system and method of the present invention, the event layout planned and prepared by the host will depend on the type of event such as a wedding, sporting event, musical event, conferences etc. Pre-made virtual layouts for the specific events are made available to the customer to choose from, and also tools are available for customers to design and upload their own layout. In the embodiments of the system and method of the invention, the event host and participants will be able to reserve boxes or tables for example for their family and friends so that they can sit together. The seating plan for the event will also depend on the type of event. For example, for sporting events, the event layout may be a stadium with boxes for seating of participants whereas for a wedding, the seating plan requires tables accommodating a specific number of guests/participants. In the system of the invention the terms "box" or "boxes" may be used interchangeably with the terms "table" or "tables." If allowed by the host, participants of the event can create their own boxes, or tables. The number of seats at each box or table is decided by the host. These boxes or tables as well as the seats are numbered. A participant can see the video, hear the audio, speaker icon, video icon and the names of all the participants sitting at the same box or table and share their screen with other participants. Participants sitting inside the box, for example, box number 9 will be able to see the video and hear the audio of all the participants sitting in box number 9 and can also chat with them. The host is able to give certain participants moderating powers which will allow that participant to replace the host's video stream with their own. For instance, a company's representative will be able to display their own video to the participants instead of them viewing the video streamed by the host.

In the embodiments of the system and method of the invention, the participants at a box or table will be able to share their screens with other participants and can also tag other participants who are sitting virtually at their box or table and have a one-on-one chat with them through a chat box feature of the system. There are two types of chat boxes. One will be a local chat box among the participants sitting at the same box or table, and the other will be a global chat box among all participants in the event. Through the chat boxes, participants can send messages to specific participants by tagging them. In the exemplary embodiment of the platform of the invention, a participant can stop the audio and/or video of any other participant who they do not want to see or listen to without affecting the ability of other participants sitting in the same box or table from being able to see the video and hear the audio of the participant who was blocked by the other participant. For example, if participant A does not want to hear the audio and/or see the video of specific participants who are at the same box or table, participant A can mute or stop the audio and/or video of those specific participants by clicking on the participant's audio and/or video icons. Other participants sitting at the box or table will still be able to hear and see the participant that participant A chooses not to see or hear. Participants can minimize, maximize, zoom or scroll through the video/audio streaming, event layout and participants attending.

In one exemplary embodiment of the system and method of the invention the host may be a political candidate who can make the virtual event layout a stage and auditorium. In the auditorium, people can see their location, move from one location to another, and see and talk to the people around them. To make this experience happen virtually, seats in the auditorium will be grouped into boxes. People may be able to virtually see their location and themselves walking between the aisles. When a person decides to sit at a place or an assigned place, that person will be able to chat and see the people sitting in the same box while listening to the political candidate together. The audience can move between boxes and find the one with the people they like the best. They can also choose to reserve a box with friends and family for a more personal experience. In these boxes, people may have discussions or cheer with others while watching and listening to the political candidate's speech on one section of the screen.

In another exemplary embodiment for example a birthday party or wedding, the host selects the virtual venue, decorations, a layout of tables and chairs, and stage. On the day of the celebration, the guests join the event, sit at the designated table if it is assigned, or choose the table of their choice. They meet with the host and other invited people/guests and sit anywhere to chat. The guests can simultaneously watch the video/audio streaming of the celebration and see and talk to other guests sitting at the same table. Although the interactions of the guests/participants at the event may be virtual, the exemplary features of the system and method of the invention provides the same experience as a real-life scenario while the event is streaming, with people joining the event virtually moving from one place to another place using the event layout, and talking to the people sitting virtually on a table.

In another example, in an office space, everyone sits in their cubicle virtually and has easy access to everyone else in the office. They can meet at any time and work on any assignment. The system and method of the invention provides a real-life experience of working as a team in the office from the convenience of their homes. Individuals can create their own office layout and employees can sit virtually in their cubicles or offices. This way people can see each other's presence/availability in the office, meet using the video call, share screen, chat, and have discussions.

The platform of the present invention may host events comprising a small number of people to several hundreds of thousands of people without compromising effective interactive video communications between the viewers and participants of the events while they watch the video and audio streaming of the event which may for example be, sports events, musical events, weddings, family gatherings and other such events. The platform of the invention enhances virtual events/meetings close to real-life experience in events like personal parties, sporting events, town hall meetings, community events, conferences, or running a virtual office.

BRIEF DESCRIPTION OF THE DRAWINGS

The present invention is illustrated by way of examples, and not by way of limitations, in the figures of the accompanying drawings in which.

DETAILED DESCRIPTION OF THE INVENTION

The present invention is a system and method for real-life interactions between virtual participants in a small or large gathering event such as a wedding, sports event, music event, conference etc. The platform of the invention gives virtual participants in an event an opportunity to have one on one or group interactions with any number of other virtual participants in a gathering of potentially hundreds of thousands of people. The system of the invention uses standard live/prerecorded streaming technology services and/or live/prerecorded streaming equipment to stream the events and standard conferencing technology and equipment for facilitating real-life virtual interactions between the event participants.

Figure 1:
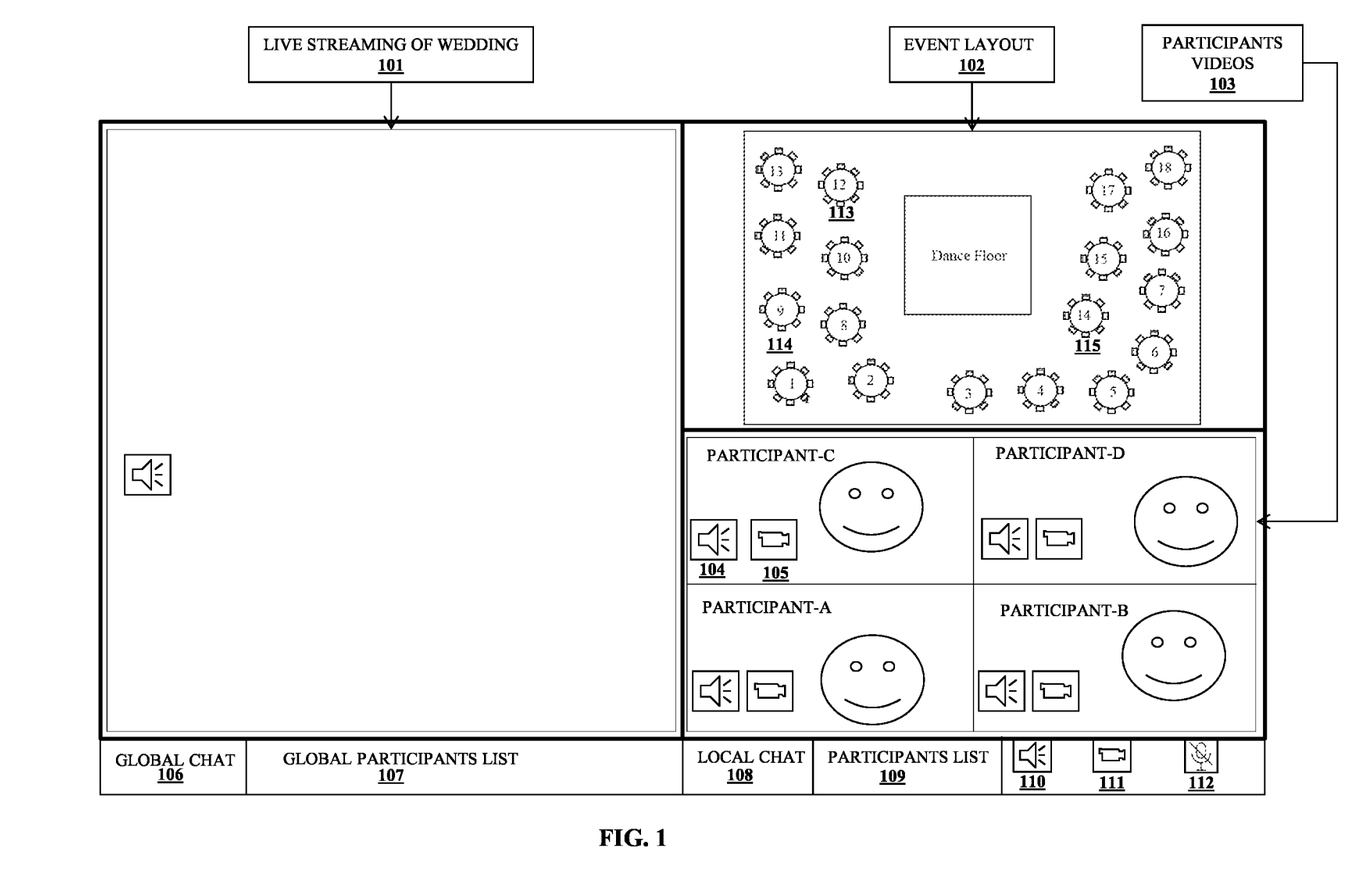
FIG. 1 is a functional diagram illustrating an example of a typical view of the participant's screen after joining an event through the system platform.

Referring now to the drawings wherein like numerals represent like components, FIG. 1 is a functional diagram illustrating an example of a typical view of the participant's screen after joining an event through the system platform. This figure explores some of the ways participants can interact. The host is live streaming a wedding event and the participants can see the live streaming of the wedding 101 on their computers, or mobile devices. In this figure, there are four participants, participant A, participant B, participant C, and participant D, who have joined the wedding event and have a seating arrangement within the event layout 102. In this figure, the event layout 102 shows 18 tables with chairs, and each table is labeled with a number for example table number 9 114. The figure shows participant A's screen after joining the event when all four participants are sitting at table 9 114. All participants in the event see the same live streaming. In participant's video box 103, participant A can see the video 105 and hear the audio 104 of all participants sitting at the same table as participant A, table 9 114. If participant A does not want to hear the audio 104 and/or see the video 105 of participant C, participant A can stop the audio and/or video of participant C by clicking on audio 104 and/or video 105 icons on their device screen. For other participants sitting at table 9 114, participant B and participant D, the video 105 and the audio 104 of participant C will not be affected. Other participants in table 9 114 will still be able to hear and see participant C. In the event layout 102 section, all participants can see which tables are full and see which seats are vacant at those tables. In the event layout 102 any participant can choose any unreserved table and sit there if a seat is vacant. If no one is sitting at table 14 115, and if participant A moves from table 9 114 to table 14 115, then participant A will be able to see only themselves in the participant video section since no other participants are sitting on table 14 115. Among Participants A, B, C, and D, if table 12 113 is reserved for participant B, then only participant B can join table 12 out of these four participants. Participant B can join any unreserved table and come back any time to their reserved table 113. Participants A, C, and D will lose their previously occupied seats if they move to a different table. Participants can also search for other participants and their locations, seat numbers and table numbers. All participants will also have chat boxes. One chat box 108 will be among the participants sitting at the same table. For example, if participants A, B, C, and D are sitting at the same table they will have the same chat box 108. If all four participants are sitting at different tables, they can still chat between them using global chat 106. In the chat boxes 108 and 106, participants can also tag other participants and send messages specifically to them. Similarly, participants can see the list 109 of participants sitting on their table and a list 107 of all participants in the event. The participants can also mute their own audio 112, stop their own computer/mobile device speaker 110, and stop their own video 111.

Figure 2:
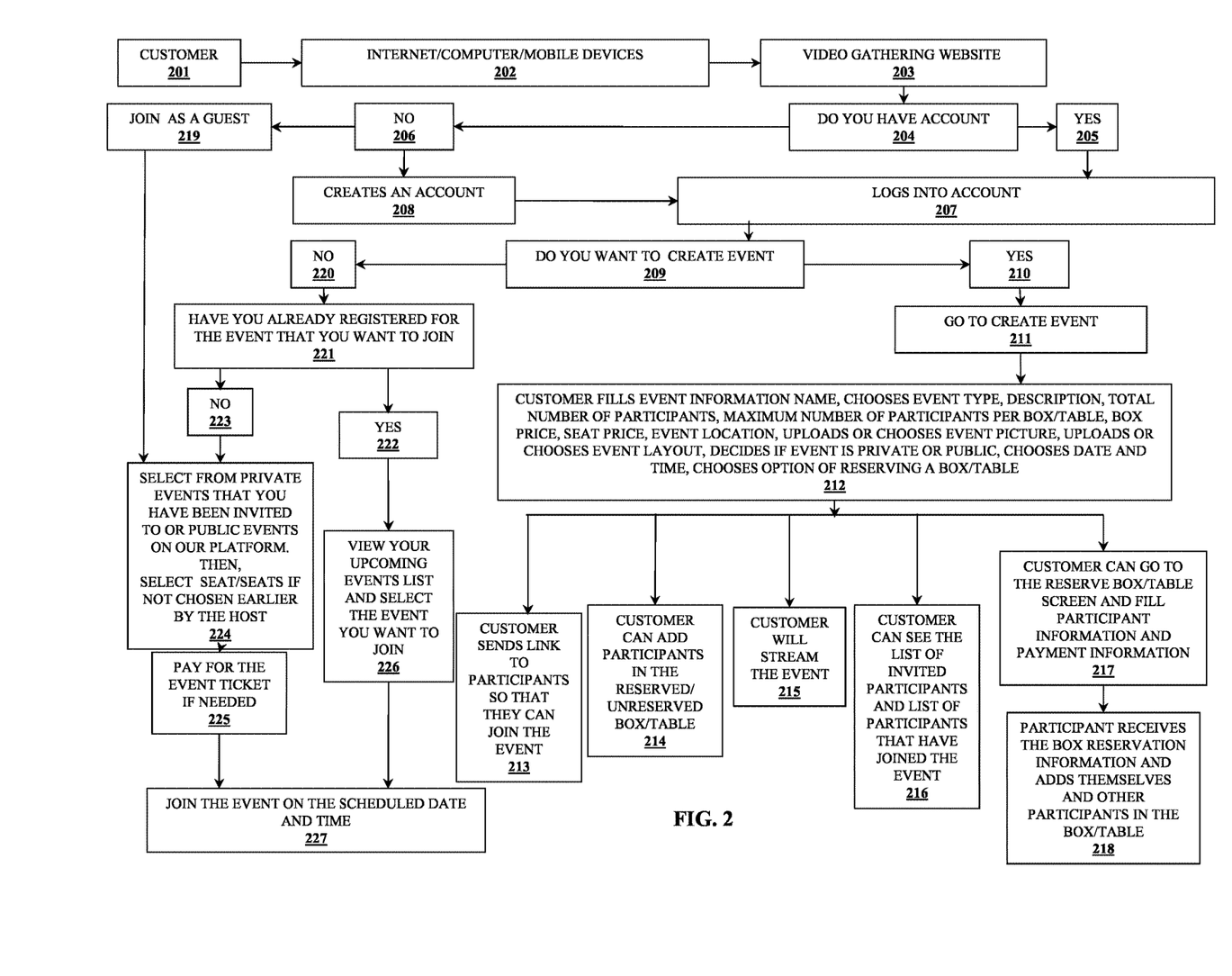
FIG. 2 is a block diagram illustrating an example of a customer either creating an event as a host or joining an event as a participant.

FIG. 2 is a block diagram of an exemplary embodiment of the invention illustrating an example of a customer either creating an event as a host or joining an event as a participant. Customer 201 accesses the video gathering app or the website 203 by using any device for example computer, laptop, tablet, smartphone, etc. 202. The customer checks 204 if the customer already has an account on the platform, and if an account exists 205, the customer logs in 207. If the customer does not have an account 206, the customer creates an account 208 and logs in or joins as a guest 219. After logging in, the customer has the option of creating an event 209 or joining an event. If the customer wants to create an event 210, the customer goes to the create an event tab 211. The customer fills up the event information 212 including event name, event type, description, the total number of participants, the maximum number of participants per box/table, box price, seat price, event location, uploads or selects event picture, uploads or selects event layout, selects if the event is public or private, selects event date and time, and selects the option of reserving box/table. The customer now becomes a host of the event. If the customer/host wants to reserve boxes/tables for other customers also known as participants, the customer/host can choose the reserve box/table tab and fill out the participants' information and payment information and reserve the box/table 217. The participants receive the box/table reservation information and add themselves and other participants to the box/table 218. The customer/host can send the event link to the participants so that the participants can join the event 213. The customer/host can add other participants in the reserved/unreserved box/table 214. The customer/host can stream the event 215 and see the list of invited participants and the list of participants that have joined the event 216. If the customer does not want 220 to create an event, the customer can join an event. If a customer joins an event, then the customer is known as a participant. The customer/participant can check if they have already registered for the event that they want to join 221. If the customer/participant has already registered 222 for the event, they can view the upcoming events list, select the event that they want to join 226, and join the event on the scheduled date and time 227. If customer/participant has not registered 223 for the event, customer/participant can select from the private event that they have been invited to or public events on the website 224, select a seat if not assigned by the host, pay 225 for the event ticket if needed, and join the event on the selected date and time 227. After joining the event, the customer/participant watches and interacts with the event and other participants on their devices.

Figure 3:
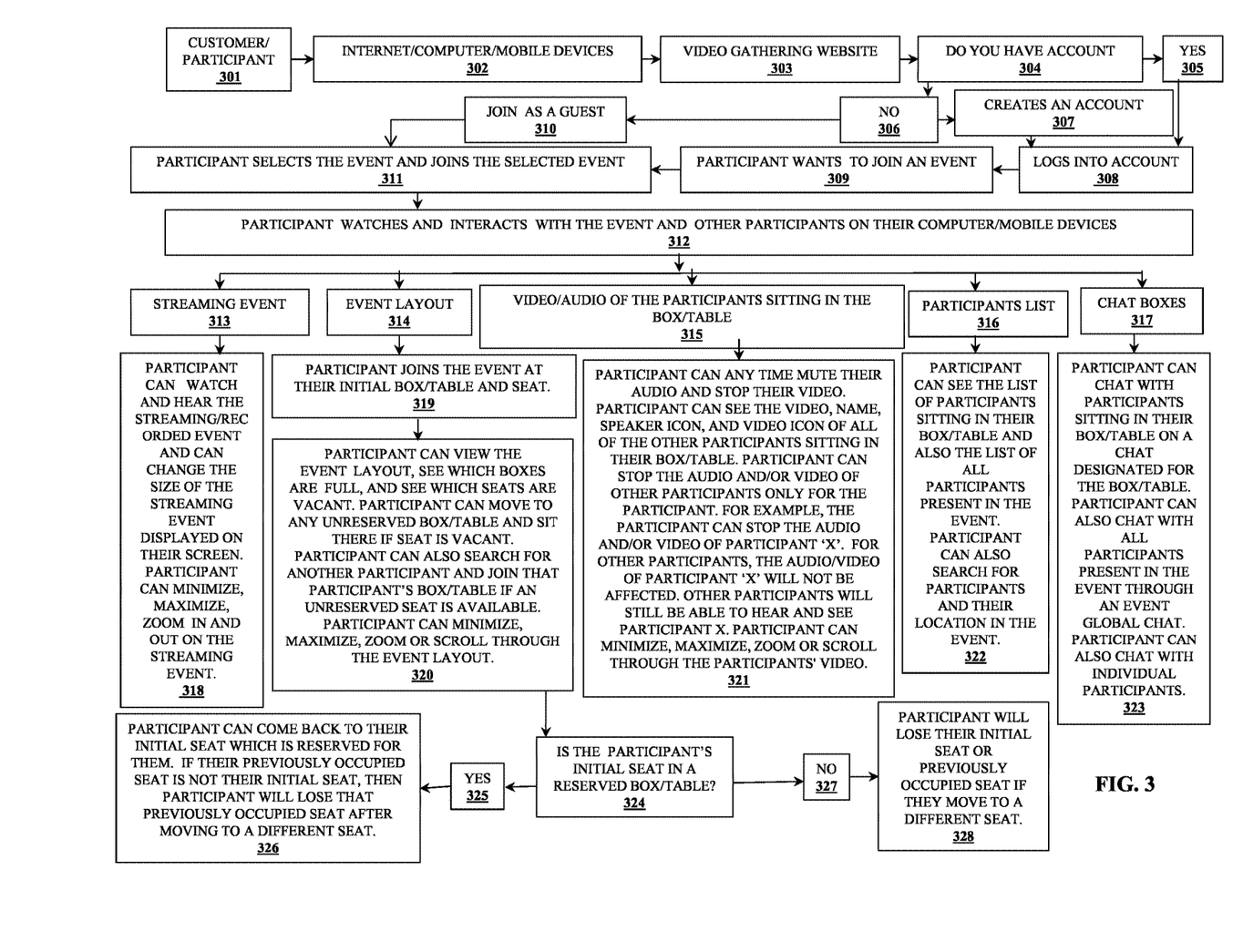
FIG. 3 is a block diagram illustrating an example of a customer participating in an event, watching and interacting with the event and other participants in the event.

FIG. 3 is a block diagram of an exemplary embodiment of the method of the invention in which a customer 301 wants to join an event as a participant. There are many ways to join and interact with other participants in the event. This figure explores one of the paths. In the figure, the term 'customer' is used for one of the participants and the term 'participants' is used for all other participants in the event. The customer 301 accesses the internet using any devices 302 for example, computer, laptop, tablet, smartphone etc., and goes to the system platform app or website 303. The customer checks 304 if the customer already has an account on the platform, and if an account exists checks 305 and the customer logs in 308. If a customer does not have an account 306, the customer creates an account 307 and logs in or joins as a guest 310. After logging in, if the customer wants to join an event 309 the customer selects that event and joins the selected event 311. The customer will first be assigned an initial seat which they choose when registering or which was chosen by the host. Similarly, other participants also join the event via their initial seat in a box/table. The customer watches and interacts with the event and other participants in the event on their devices 312. The customer will be able to see the video and hear the audio of other participants that are in the same box/table as the customer. The customer and the other participants watch the streaming event on their device 313, view the event layout 314, watch the video and hear the audio of other participants 315, view the participants list 316, and chat using the chat boxes 317. The event's host streams the event 313 which customer/participants watch on their screen. The streamed event is watched by all of the participants in the event irrespective of their seat number and box/table that they are sitting in. The customer/host may record the event and customer may also access recording of the event on demand 318. Customer/participants can change the size of the streaming event on their screen. Customer/participants can minimize, maximize, and zoom in and out of the streaming event 318.

The event layout includes boxes/tables for the participant to sit in or join virtually. In the event layout 314, the customer joins the event at their initial seat and box/table 319. The customer can see where the customer is sitting i.e., box/table in the event layout 320. In another section of their screen, the customer can see the video and hear the audio of all participants sitting at the same box/table as participant 315. Additionally, the customer sees the names and also the speaker and video icons of each participant sitting in the same box/table as the customer 321. The other participants can see the video and hear the audio of the customer too if they are in the same box/table as the customer. The customer can mute their own audio and stop their own video 321. If the customer does not want to hear the audio and/or see the video of specific participants who are in the same box/table as the customer, the customer can stop the audio and/or video of those participants by clicking on the participants' audio and/or video icons. For other participants sitting in the customer's box/table, the audio/video will not be affected. Other participants will still be able to hear and see the participants that the customer chooses not to see/hear. In the event layout section, the customer can see which boxes/tables are full and see which seats are vacant at those boxes/tables 320. In the event layout, the customer or any participant can choose any unreserved box/table and sit there if a seat is vacant 320. The customer can also search for a participant and the participant's location i.e., seat number and box number 322. The customer can join that participant if a seat is available in that participant's box/table 320. The customer can minimize, maximize, zoom and/or scroll through the event layout or participants' video section on their computer/mobile device. If the customer has 325 an initial seat in a reserved box 324 the customer can go back to their initial seat in their reserved box even after moving to other boxes 326. If the customer's initial seat or previously occupied seat is not in a reserved box 327, then the customer will lose their initial seat or previously occupied seat after moving to a different seat 328. Customers can see the participants list 316. There are two types of participants lists. One is a list of the participants in the box/table where the customer is currently sitting, and the other is a list of all participants that have joined the event 322. The customer can also chat with other participants using chat boxes 317. There are two types of chat boxes 317. One will be a local chat box among the participants sitting at the same box/table, and the other will be a global chat box among all participants in the event 323.

Figure 4:
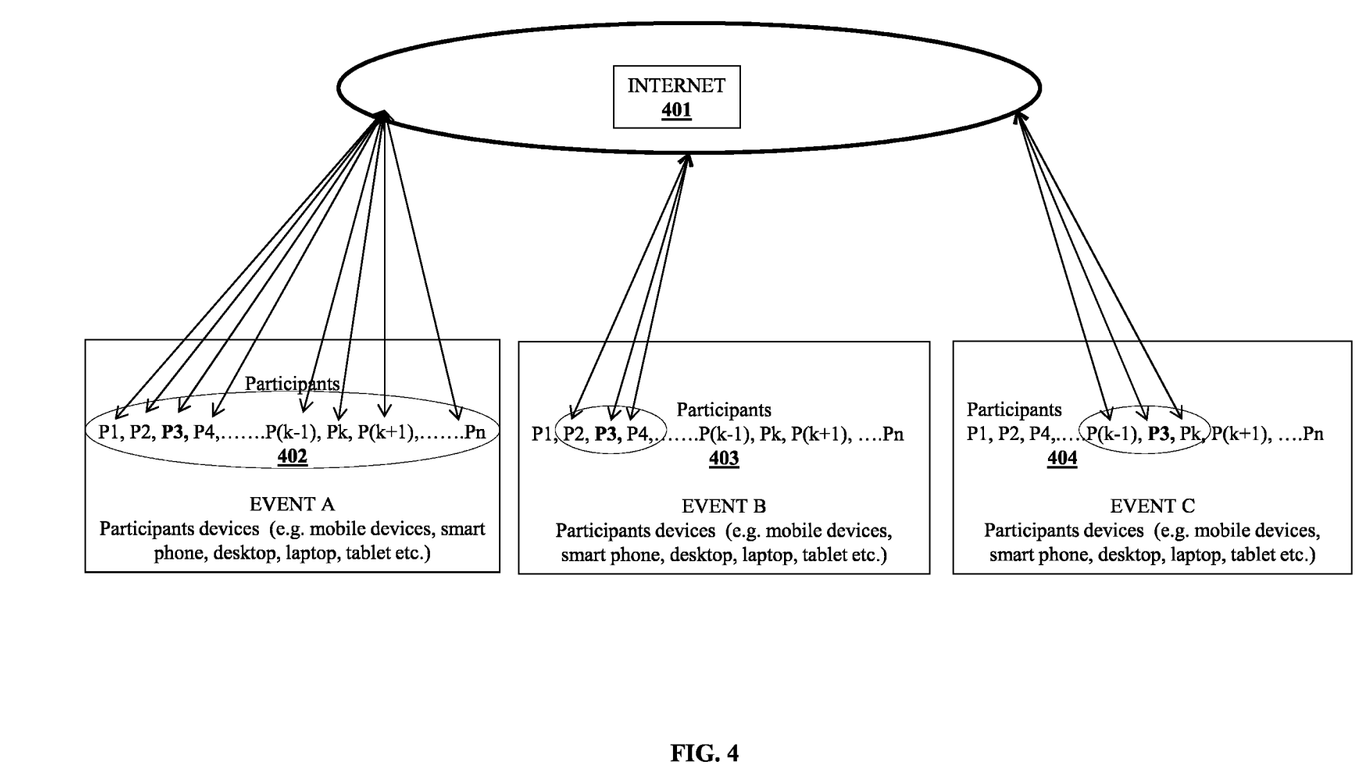
FIG. 4 is a block diagram illustrating examples of methods of video chatting between participants that have joined the event virtually using less bandwidth.

FIG. 4 is a block diagram illustrating examples of methods of video chatting between individual participants that have joined the event virtually. Event A 402, event B 403, and event C 404, all are examples of the same event and showing methods of video chatting. P1, P2, P3 . . . , and Pn are the individual participants that have joined the event virtually. Events on current video calling platforms are normally like event A 402, where a participant sees all participants at the same time and engages with them through video chat. For example, if there are 4 participants, then all 4 are connected to each other with the video chat i.e., P1 is connected to P2, P3 and P4, P2 is connected to P1, P3 and P4, P3 is connected to P1, P2 and P4 and finally P4 is connected to P1, P2, and P3. In this case, there are 6 unique one to one connection. In event A 402, if the number of participants is n, then participant P3 is in a video chat with n−1 participants. In the case of 100,000 participants, the total number of video connections among participants will be huge and that needs a lot of internet 401 data and huge bandwidth. In non-virtual events, participants normally sit or stand in a group and talk to the people around them. Event B 403 is showing that participant P3 is talking to participants P2 and P4, and the number of connections between these three will be 3 in the group of participants P2, P3 and P4. Event C 404 is showing that participant P3 moves to a new position and is now surrounded by participants P(k−1) and Pk. Participant P3 in event C 404 is now chatting with participant P(k−1) and Pk. In this method used by events B 403 and C 404, participant P3 has access to all of the participants in the event, but P3 is connected through a video chat with only the group of participants sitting with P3 at any given time. If the host of the event limits each group to X participants, then the total number of groups in the event is n/X, where n is the total number of participants in the event. The total number of connections in event B 403 and C 404 will be far less than the number of connections in event A 402. The method used in events B 403 and C 404 will need a smaller bandwidth compared to the bandwidth required in event A 402. Our video gathering platform uses the method displayed in events B 403 and C 404 to reduce the load on the internet 401.

Figure 5:
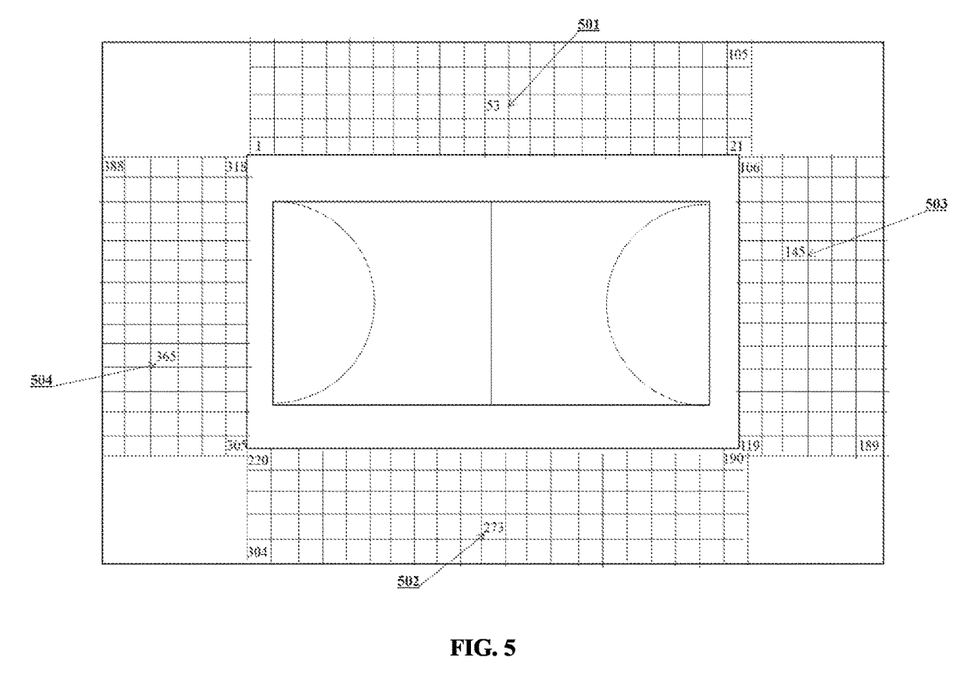
FIG. 5 is a diagram illustrating an example of a sports event layout.

FIG. 5 is a diagram illustrating an example of a sports event layout. This diagram is an exemplary method of a school's basketball court layout. In this figure, there are 388 boxes. If the host limits each box to 10 participants, then there is a total of 3880 participants watching the game together while having virtual interactions with each other.

Similarly, this event layout for a popular sports event can allow hundreds of thousands of people across the globe to watch the game together while having one to one or group interactions. As an example, a participant sitting at box 53 501 can move to box 273 502. Then the participant can move to box 145 503 and then to box number 365 504. Every time the participant moves to a new box, the participant sees up to 9 new people (assuming 10 people can sit at each box) sitting with the participant. In this example, the participant can have interactions with 36 people.

Figure 6:
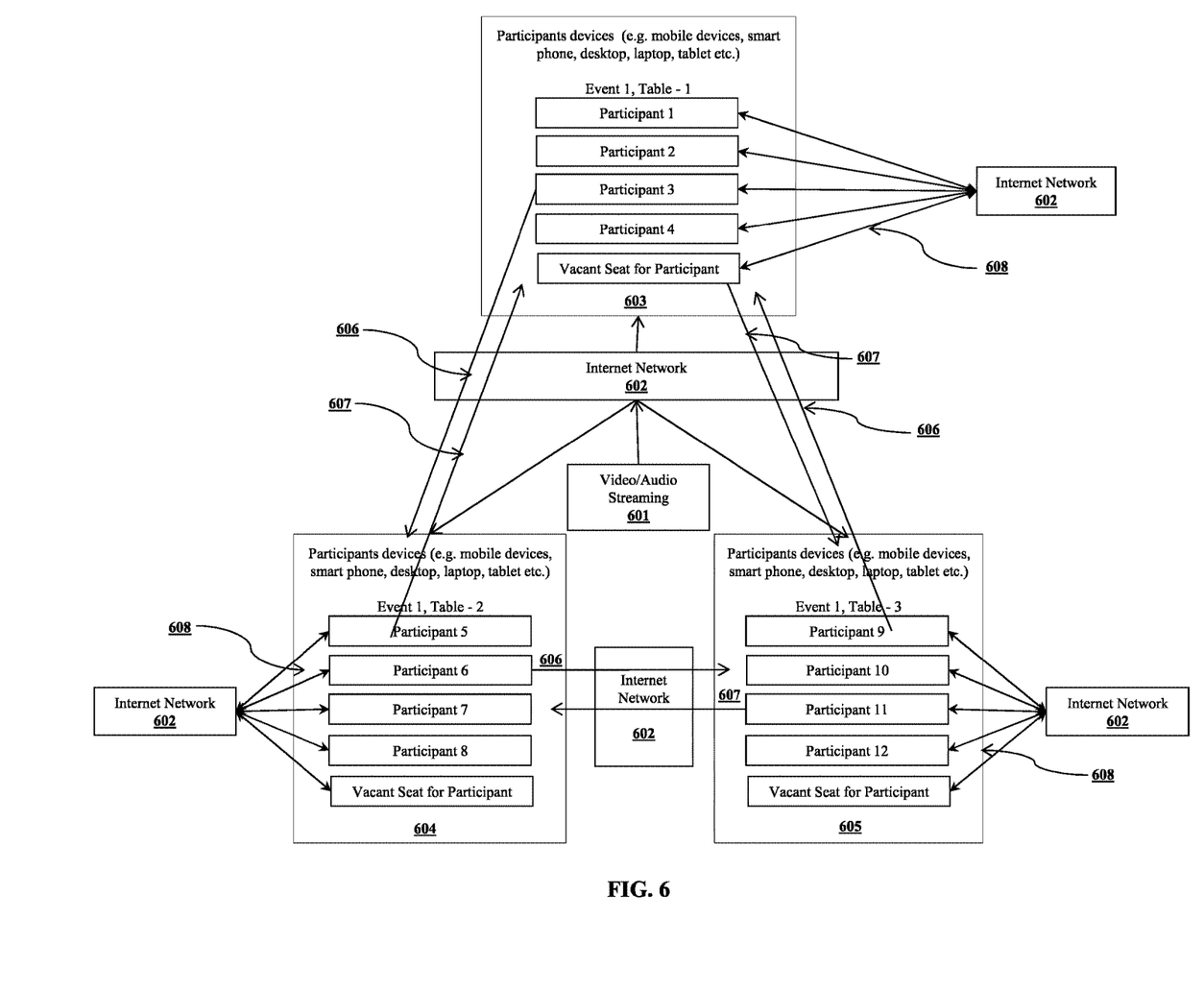
FIG. 6 is a block diagram of an exemplary illustration of the system architecture.

FIG. 6 is a block diagram of an exemplary illustration of the system architecture for a wedding event (Event 1) in which host streams 601 the event and participants join the event virtually using the platform of the invention. In this Event 1, there are virtual tables and seats for the participants to sit at and the participants can move from one table to another table in Event 1. On each table, participants watch the video/audio stream of the event and can also video/audio chat with the participants sitting on their table. Host streams 601 the video/audio of the event. The video/audio stream is sent to the virtual gathering platform/internet network 602 from the streaming device. In this example Event 1, there are three tables, 603, 604, and 605, and 4 participants are sitting on each table. In this example, one seat is vacant on each table. Participants join the event through their desktop, mobile devices such as smart phone, laptop, tablet etc., and virtually sit at a seat on one of the tables. Through the internet 602, on table 1 603, participants 1, 2, 3, and 4 watch the streamed video/audio event and also video/audio chat with the participants sitting on their table 1. Through internet 602 on table 1 603 participant 1 is connected 608 with participants 2, 3, and 4, similarly participant 2 is connected 608 with participants 1, 3, and 4, participant 3 is connected 608 with participants 2, 1, and 4, and participant 4 is connected 608 with participants 2, 3, and 1. The same applies for tables2 604 and3 605 and the participants at those tables. In this example each table 603, 604, and 605 has a vacant seat. Participant on table 1 603 can move 606 to the vacant seat on table 2 604 via internet network 602. Similarly, participant on table 2 604 can move 607 to the vacant seat on table 1 603 via internet network 602. This is an example of participant's movement between table 1 and table 2. Participants can move from one table to another table and join the participants at the new table. Although in this example only 3 tables were used to explain the movement of the participants from one table to another in the event, there can be any number of tables in an event and also more than one event at a time.

The foregoing description of the system and method of the present invention through its figures and preferred embodiment (s) should not be construed to limit the scope of the invention. It is to be understood that the embodiment (s) of the invention as described herein do not limit any application or scope of the invention and that the invention can be carried out and practiced in various ways and implemented in embodiments other than the ones outlined in the summary and detailed description of the working and application of the system. It should be understood and obvious to one skilled in the art that alternatives, modifications, and variations of the embodiments of the present invention as described may be construed to be within the spirit and scope of the appended claims.

What is claimed is:
1. A method for real-life interactive experience between virtual participants in a virtual gathering of an event comprising:

a) a virtual gathering online platform for customers to register as said virtual participants in said virtual gathering of said event;
b) a host streaming said event;
c) a plurality of registered said virtual participants watching a video and listening to an audio of said streaming of said event by said host through a graphical user interface (GUI) of their computers and mobile devices while sitting in remote locations;
d) said host providing an event layout for said plurality of said virtual participants to view;
e) said event layout comprises boxes and tables with seats for said plurality of virtual participants to sit while viewing and listening to said streaming of said event by said host;
f) said plurality of virtual participants reserve said boxes and said tables with said seats for a price set by said host and said virtual participants paying said price when registering to watch said video and listen to said audio of said streaming of said virtual gathering of said event;
g) said plurality of virtual participants without reserving a box and table buying said seats for a price set by said host when registering to watch said video and listen to said audio of said streaming of said virtual gathering of said event;
h) said virtual participants accessing an event on their said computers and said mobile devices to see said event layout for said virtual gathering of said event;
i) said plurality of virtual participants see a list of all said plurality of virtual participants at said event and see all said virtual participants at said event sitting on said seats at said boxes and said tables through said GUI of their said computers and said mobile devices;
j) said plurality of virtual participants able to see said video and hear said audio of a plurality of other virtual participants that are sitting at the same said box and same said table as said plurality of said virtual participants;
k) said plurality of virtual participants joining said plurality of said other virtual participants of said event and virtually interacting with each other at said virtual gathering of said event;
l) Said virtual interactions between said plurality of virtual participants at said virtual gathering of said event comprises, said plurality of virtual participants moving to sit at other said tables and said boxes to interact with a plurality of virtual participants sitting at said other tables and said other boxes;
m) said virtual participants mingle and move virtually in a crowd gathered for said event and stop by and meet said other virtual participants around them while watching said event;
n) said virtual interactions between said plurality of virtual participants at said virtual gathering of said event comprises sitting at said tables and said boxes next to a plurality of said other virtual participants and chatting with said plurality of said other participants via video and audio and chat boxes, wherein said chat boxes are local chat boxes for said virtual participants seated at said same table and said same box and global chat boxes for all said participants of said event;
o) said virtual participants send messages to specific virtual participants by tagging them through said chat boxes;
p) said virtual interactions between said plurality of virtual participants at said virtual gathering of said event comprises said plurality of virtual participants able to stop said audio and said video of a participant on the said same table and box by clicking on said audio and said video icons of that participant on their said device screen without stopping said audio and said video of blocked participant for all other participants sitting at the said same box and said same table;

q) said host able to record the said event and said plurality of virtual participants can watch the said recording on demand; and r) wherein said plurality of virtual participants of said virtual gathering of said event through said virtual interactions with said plurality of said other virtual participants of said event have a real-life interactive experience with said plurality of virtual participants of said event.

2. The method of claim 1, wherein the customer after registering on the virtual gathering platform creates an event to become the host of the event to stream the event for the event participants.

3. The method of claim 1, wherein the virtual layouts for specific events are made available to the customer to choose from and tools for customers to design and upload their own layout.

4. The method of claim 1, wherein the participants are able to virtually see their own locations and the locations of other participants in the event layout.

5. The method of claim 1, wherein the participants search for other participants of the event and after seeing the seat number and table/box number of the chosen participants, move virtually to the location of the other participants if a seat is vacant on the table/box of the other participants.

6. The method of claim 1, wherein participants see which boxes/tables are occupied and which seats are vacant in a particular table/box and move to an unreserved table/box.

7. The method of claim 1, wherein a participant can move to any unreserved table/box during the event and come back anytime to their reserved table/box.

8. The method of claim 1, wherein if a seat is not in a reserved table/box and the current occupant moves to a different location, that seat becomes available for all participants of the event.

9. The method of claim 1, wherein the virtual participants have real-life interactive experience with other virtual participants by moving virtually within the layout of the event from one area to another area of the event, stopping at other boxes/tables and sitting in a new area of their choosing while watching the video and audio streaming of the event.

10. The method of claim 1, wherein when a participant moves from one table/box to another, that participant is connected through a video chat with only the group of participants sitting at that particular table/box which uses less bandwidth while at the same time the participant is able to see a list of all participants and have access to all participants of the event.

11. The method of claim 1, wherein the host gives certain participants in a box/table powers to moderate allowing those participants to replace the host's video and audio stream with their own.

12. The method of claim 1, wherein the virtual participants have real life interactive experience with other participants of the event by being able to mute the audio and video of specific participants who they do not want to see or hear while being able to see and hear from the rest of the participants at the same table/box and, the muting of the video and audio of specific participants by a virtual participant, does not prevent the rest of the virtual participants from being able to see and hear the blocked participant.

13. A system for real-life interactive experience between participants in a virtual gathering of an event, said system comprising:

a) a virtual gathering online platform for customers to register as virtual participants in said virtual gathering of said event;

b) a host streaming said event;

c) a plurality of registered said virtual participants watching a video and listening to an audio of said streaming of said event by said host through a graphical user interface (GUI) of their computers and mobile devices while sitting in remote locations;

d) said host providing an event layout for said plurality of said virtual participants to view;

e) said event layout comprises boxes and tables with seats for said plurality of virtual participants to sit while viewing and listening to said streaming of said event by said host;

f) said plurality of virtual participants reserve said boxes and said tables with said seats for a price set by said host and said virtual participants paying said price when registering to watch said video and listen to said audio of said streaming of said virtual gathering of said event;

g) said plurality of virtual participants without reserving a box and table buying said seats for a price set by said host when registering to watch said video and listen to said audio of said streaming of said virtual gathering of said event;

h) said virtual participants accessing an event on their said computers and said mobile devices to see said event layout for said virtual gathering of said event;

i) said plurality of virtual participants see a list of all said plurality of virtual participants at said event and see all said virtual participants at said event sitting on said seats at said boxes and said tables through said GUI of their said computers and said mobile devices;

j) said plurality of virtual participants able to see said video and hear said audio of a plurality of other virtual participants that are sitting at the same said box and same said table as said plurality of said virtual participants;

k) said plurality of virtual participants joining a plurality of said other virtual participants of said event and virtually interacting with each other at said virtual gathering of said event;

l) Said virtual interactions between said plurality of virtual participants at said virtual gathering of said event comprises, said plurality of virtual participants moving to sit at other said tables and said boxes to interact with a plurality of virtual participants sitting at said other tables and boxes;

m) said virtual participants mingle and move virtually in a crowd gathered for said event and stop by and meet said other virtual participants around them while watching said event;

n) said virtual interactions between said plurality of virtual participants at said virtual gathering of said event comprises sitting at said tables and said boxes next to a plurality of said other virtual participants and chatting with said plurality of said other participants via video and audio and chat boxes, wherein said chat boxes are local chat boxes for said virtual participants seated at said same table and at said same box and global chat boxes for all said participants of said event;

o) said virtual participants send messages to specific virtual participants by tagging them through said chat boxes;

p) said virtual interactions between said plurality of virtual participants at said virtual gathering of said event comprises said plurality of virtual participants able to stop said audio and said video of a participant on the said same table and box by clicking on said audio and said video icons of that participant on their said device screen without stopping said audio and said video of blocked participant for all other participants sitting at the said same box and said same table;

q) said host able to record the said event and said plurality of virtual participants can watch the said recording on demand; and r) wherein said plurality of virtual participants of said virtual gathering of said event through said virtual interactions with said plurality of said other virtual participants of said event have a real-life interactive experience with said plurality of virtual participants of said event.

14. The system of claim 13, wherein the customer after registering on the virtual gathering platform creates an event to become the host of the event to stream the event for the event participants.

15. The system of claim 13, wherein the virtual layouts for specific events are made available to the customer to choose from and tools for customers to design and upload their own layout.

16. The system of claim 13, wherein the participants are able to virtually see their own locations and the locations of the other participants in the event layout.

17. The system of claim 13, wherein the participants search for other participants of the event and after seeing the seat number and table/box number of the chosen participants, move virtually to the location of the other participants if a seat is vacant on that table/box of the other participants.

18. The system of claim 13, wherein participants see which boxes/tables are occupied and which seats are vacant in a particular table/box and move to an unreserved table/box.

19. The system of claim 13, wherein a participant can move to any unreserved table/box during the event and come back anytime to their reserved table/box.

20. The system of claim 13, wherein if a seat is not in a reserved table/box and the current occupant moves to a different location, that seat becomes available for all participants of the event.

21. The system of claim 13, wherein the virtual participants have real-life interactive experience with other virtual participants by moving virtually within the layout of the event from one area to another area of the event, stopping at other boxes/tables and sitting in a new area of their choosing while watching the video and audio streaming of the event.

22. The system of claim 13, wherein when a participant moves from one table/box to another, that participant is connected through a video chat with only the group of participants sitting at that particular table/box which uses less bandwidth while at the same time the participant is able to see a list of all participants of the event and have access to all participants of the event.

23. The system of claim 13, wherein the host gives certain participants in a box/table powers to moderate allowing those participants to replace the host's video and audio stream with their own.

24. The system of claim 13, wherein the virtual participants have real-life interactive experience with other participants of the event by being able to mute the audio and video of specific participants who they do not want to see or hear while being able to see and hear from the rest of the participants at the same table/box and, the muting of the video and audio of specific virtual participants by a virtual participant, does not prevent the rest of the virtual participants from being able to see and hear from the blocked participant.

\* \* \* \* \*